United States Patent Office 3,511,380
Patented May 12, 1970

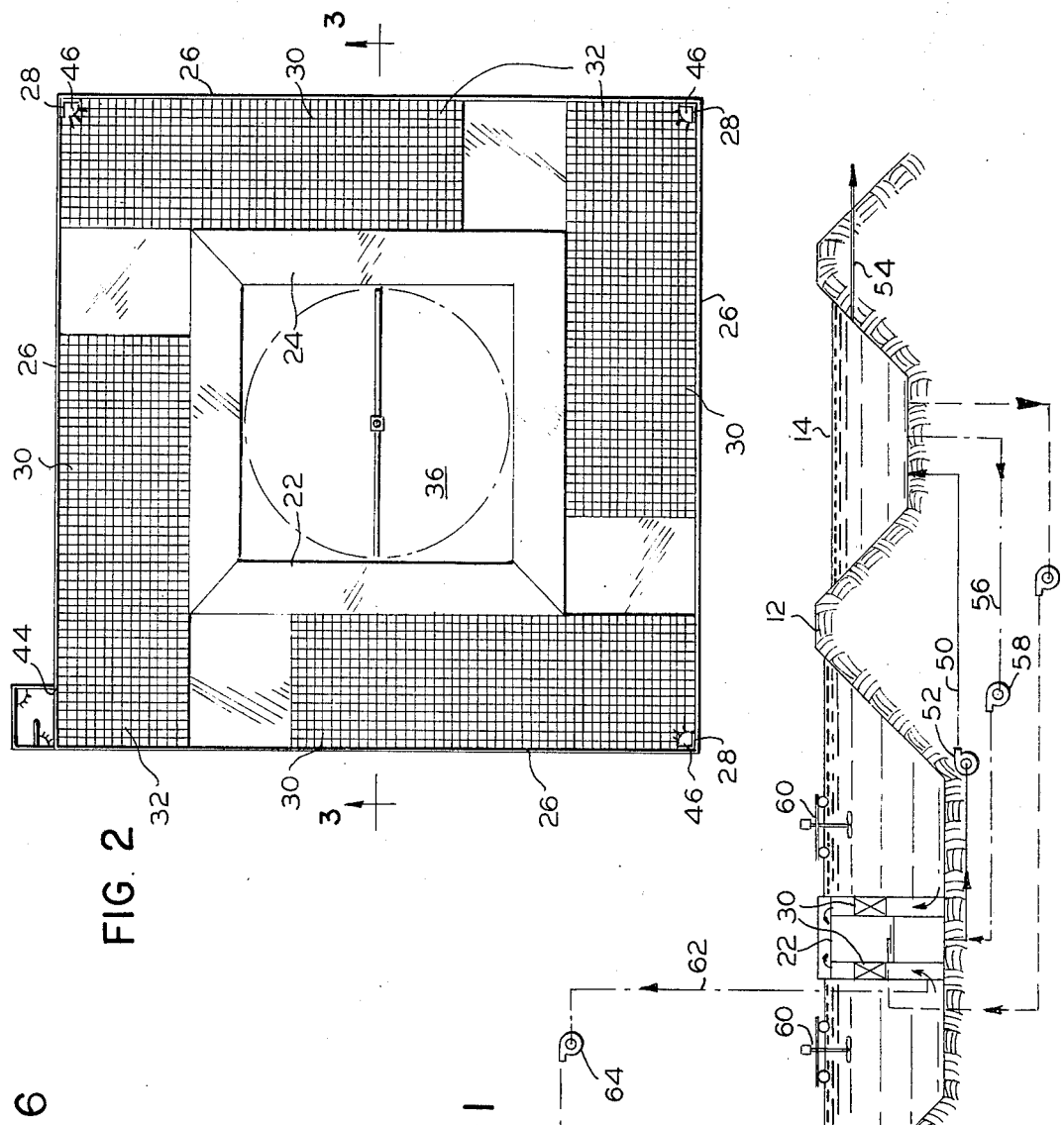
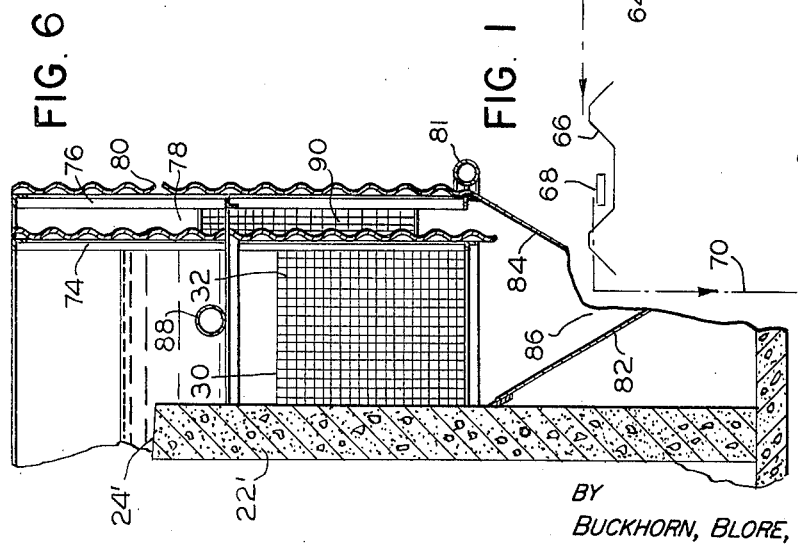
ARCHIE H. RICE
ALFRED F. SLECHTA
ANDREW K. HSIUNG
INVENTORS.
BY
BUCKHORN, BLORE, KLARQUIST & SPARKMAN
ATTORNEYS

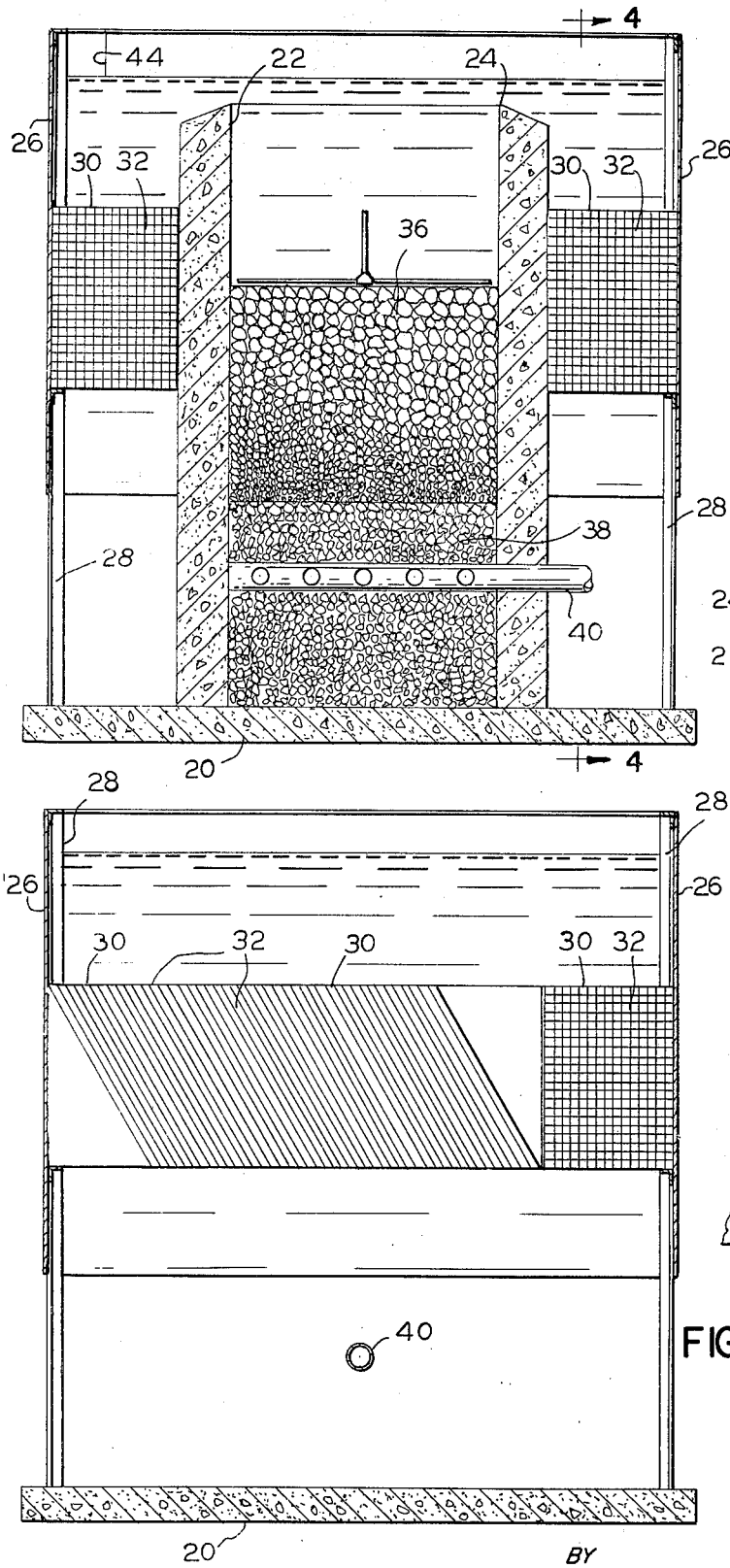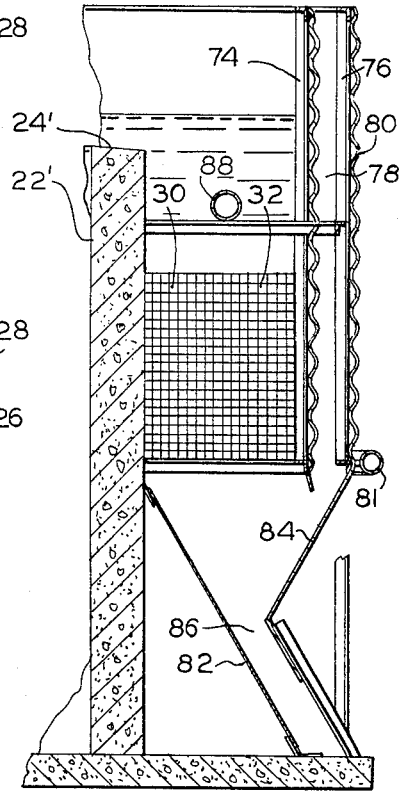

3,511,380
CLARIFICATION APPARATUS FOR
AERATED LAGOON
Archie H. Rice, Alfred F. Slechta, and Andrew K. Hsiung,
Corvallis, Oreg., assignors to Neptune Microfloc, Incorporated, Corvallis, Oreg., a corporation of Oregon
Filed Aug. 6, 1969, Ser. No. 847,978
Int. Cl. B01d 21/00, 23/16; C02c 1/18
U.S. Cl. 210—202
14 Claims

ABSTRACT OF THE DISCLOSURE

Aeration basin for sewage treatment has upright open top container therein with liquid removal system connected to lower end. Baffle system surrounds container extending above liquid level but open at bottom with settling devices comprising inclined settling tubes mounted between baffles and container to permit separation of solids. Water drawn from lower end of container is substantially clarified due to removal of solids in settling devices.

Background of the invention

To enhance the aerobic digestion of pollutions and the removal of solids and precipitatable materials from sewage and industrial waste (hereinafter collectively referred to as sewage), such sewage is frequently subjected to aeration in a suitable basin or container. Frequently, such a basin takes the form of a lagoon in which aeration may be allowed to proceed simply by agitation and introduction of air as may result from wind, or air may be introduced into the lagoon through jets or by agitation. Although a lagoon configuration is discussed in the remainder of this application it is obvious that other container configurations such as steel or concrete basins could be used. After a suitable period of aeration the sewage is withdrawn and passed to settling basins and on occasions through filters so as to remove the settleable floc which has been formed as a result of aeration. The aeration process proceeds most favorably when a ready supply of bacterial protoplasm is maintained within the lagoon.

Summary of the invention

The present invention provides an inexpensive and efficient arrangement for withdrawing a highly clarified effluent from a lagoon of the type described above while at the same time effecting a continual return of the sludge to the lagoon so as to maintain a desirable supply therein. The apparatus of the invention comprises a watertight tubular structure or container open at the top and supported from the bottom of the lagoon so as to isolate the interior of the container from the sewage outside. The top of the container is positioned below the normal level of sewage in the lagoon. Surrounding the container is a baffle arrangement which extends above the sewage level of the lagoon to isolate the container but which is arranged so that sewage may flow from the lagoon into the area between the baffle and the container. Mounted in the space between the container and the baffle are a plurality of settling devices comprising elongate tubes of small diameter inclined to the horizontal at a relatively large acute angle, the settling devices being so arranged that any sewage flowing upwardly between the baffle and the container must pass through the settling devices. The container may be provided with a filter bed therein, and means are provided to extract water from the lower level of the container. Such extraction will, of course, cause sewage to flow from beneath the edge of the baffle upwardly through the settling means, and thence over the top of the container and to the bottom thereof, such sewage passing through the filter bed if one is so provided. A majority of the solids contained within the sewage will precipitate during the passage of the sewage through the tubes and will slide downwardly within the tubes and fall back into the basin thereby maintaining a continuous return of the protoplasm carrying sludge to the lagoon. The sewage emerging from the top of the tubes will be substantially clarified and may be further clarified in passing through the filter bed. Periodically, the filter bed can be backwashed by pumping water into the lower portion of the container.

Drawings

In the drawings:
FIG. 1 is a schematic view of a sewage treatment system incorporating the invention;
FIG. 2 is a plan view of the installation to be made within a lagoon;
FIG. 3 is a sectional view taken substantially along line 3—3 of FIG. 2;
FIG. 4 is a sectional view taken substantially along line 4—4 of FIG. 3;
FIG. 5 is a fragmentary sectional view of a modified form of the invention; and
FIG. 6 is a fragmentary sectional view of still another modification of the invention.

Referring first to FIG. 1, the invention is illustrated with an aerated lagoon 10 formed by dikes 12. The water is removed from the lagoon 10 and passed to a storage basin or lagoon 14 which also may be created by dikes.

The sewage to be treated is passed into the lagoon 10 by an inlet line 16 and preferably it is passed through a comminutor 18 so as to reduce any solids to a fine particle size. Mounted within the lagoon is the apparatus of the invention. Preferably the lagoon is provided in the center with a concrete supporting pad 20 (FIG. 2) upon which a tubular structure or container 22 is supported and which also may be constructed of concrete or other water impervious material so as to enable the interior of the container 22 to be isolated from the remaining portion of the lagoon. The top 24 of the container 22 is preferably slightly below the normal level of sewage to be treated within the lagoon. Surrounding the container 22 is a baffle means which may comprise sheets 26 of a suitable liquid impervious material suitably supported on columns 28 so that the sheets extend above the normal level of liquid within the lagoon but also so that the bottom edges thereof are spaced a substantial distance above the bottom of the lagoon.

Mounted between the baffles or sheets 26 and the container 22 are settling means comprising modules 30 of tubes 32 inclined at a large acute angle to the horizontal, that is, an angle of between about 45° and 75°. The modules 30 are so disposed that any sewage flowing upwardly within the baffle 26 must pass through the tubes 32.

A filter bed may be provided within the container 22. Such filter may comprise a bed 36 of media grading from coarse to fine in the downward direction, such as is described in Pat. No. 3,343,680. Such bed is suitably supported, such as on a bed of gravel 38, in which underdrain laterals 40 are disposed for withdrawing water that is trickling down through the filter. If a filter bed is not provided any suitable drain outlet may be provided for collecting sewage at the bottom of the container for withdrawal or the filter compartment may be eliminated and an effluent collection system installed directly above the tubes.

Preferably, the baffle 26 is provided with a notch 44 in one upper corner thereof and spraying devices 46 are located at each of the other three corners of the baffle so as to effect a surface current in the direction towards the notch 44, thus to effect removal of any floating material which may collect within the baffle.

The filter effluent collected in the laterals 40 is passed to the storage basin 14 through a line 50 containing a pump 52. The effluent within the lagoon 14 may be treated with chlorine or subjected to other treatment as desired and the effluent finally withdrawn through a line 54 for discharge.

To enable the filter to be backwashed a line 56 containing a pump 58 is connected between the lagoon 14 and the underdrain lateral 40.

One or more floating mechanical aerators 60 may be provided for aerating and agitating the sewage within the lagoon 10.

Periodically the excess waste sludge of the lagoon may be removed through a line 62 and pump 64 to an aerobic lagoon or sludge storage tank 66. A settling device 68 somewhat similar to the modules 30 may be provided therein so that effluent of some degree of clarity may be withdrawn and returned to the lagoon 10 through a line 70.

As is apparent from what has been said before, withdrawal of effluent from the bottom of container 22 causes sewage to flow upwardly through the tubes 32 and thence into the container 22. The total cross sectional area of the tubes 32 and the rate of withdrawal of effluent from container 22 are such that the upward flow of sewage in the tubes is substantially laminar. The effluent discharging from the tops of the tubes 32 will have a high degree of clarity. For example, while the sewage in lagoon 10 may have a solids content of several hundred parts per million, the effluent from the tubes 32 will have a solids content of only 20 to 30 p.p.m. This can be reduced substantially more by incorporating a filter bed 36 if the receiving body cannot tolerate solids of 20–30 p.p.m.

An alternate baffle arrangement is illustrated in FIG. 5. In this embodiment the baffle comprises an inner wall 74 extending upwardly from the lower edge of the modules 30 to a level above the maximum liquid level in the lagoon. Spaced from the inner wall 74 is an outer wall 76 which is preferably of the same vertical extent as the wall 74, the walls 74, 76 defining an annular channel 78. The wall 76 is provided with a plurality of openings 80 at about the elevation of the top 24' of the container 22' through which openings the liquid in the lagoon can flow into the channel 78. Extending around the lower periphery of the outer wall 76 is an air header 81 connected to a suitable source of air (not shown) and perforated so as to provide a curtain of air bubbles passing upwardly adjacent the outer surface of the wall 76, the purpose of which will be explained subsequently. There are some advantages, as discussed later, in some cases in placing tube modules 90 in the annular channel 78.

Extending angularly downwardly and outwardly from the lower inner edge of each of the modules 30 is a plate 82 for guiding and directing separated solids outwardly into the lagoon. Baffles 84 are secured at their upper edges to the lower edge of each outer wall 76. The baffles 84 constitute extensions of the walls 76 and are inclined inwardly toward the plates 82 but are spaced therefrom so as to provide a passageway 86 for the separated material sliding downwardly on a plate 82.

In operation, removal of water from the bottom of the container 22 induces a flow of water from the lagoon inwardly through the openings 80, thence downwardly in the channel 78 and thence upwardly through the tube modules 30. The solids which separate in the modules will fall upon the plates 82 and will slide or flow downwardly along such plates to the bottom of the lagoon. The air flowing upwardly from the headers 81 will induce an upward flow of liquid along the outer wall 76 which will tend to be fed in part at least by the solids-laden liquid at the bottom of the lagoon adjacent the lower edge of the plates 82 causing at least some of the solids to be carried upwardly and redistributed back into the lagoon to enhance the amount of bacterial protoplasma present. It has the further purpose of preventing short circuiting of separated solids back into the inflow into the bottom of the modules, the baffles 84 further assisting in preventing such short circuiting. Furthermore, air bubbles will attach to some of the sludge to render it floatable so that a waste sludge float will form on the lagoon and which can be removed by any suitable means (not shown). Such sludge has a lesser water content than is normally found in a floating sludge and thus significant savings can be realized in its further processing. The air release also increases the amount of oxygen available for the activated sludge process, thereby enabling a reduction in the size of the mechanical aerators otherwise required. A bypass collector system including perforated pipes 88 located over the modules 30 may be provided to collect water from the area over the modules in the event it is not desired to put all the water through the filter.

Referring to FIG. 6, the placement of tube modules 90 in the annular channel 78 will provide improved flow distribution to the inlet of the modules 30. Also, as the flow passes downward through the outer modules 90, any floating material tends to rise to the top of the tubular passageways and be removed prior to entering the settling modules 30. The improved removal of floating material provided by the downflow tubes 90 enhances the quality of settled effluent eventually discharged or applied to the filter.

Having illustrated and described certain preferred embodiments of the invention, it should be apparent to those skilled in the art that the invention permits of modification in arrangement and detail.

We claim:

1. An aerated basin for the treatment of sewage including means for maintaining a body of said sewage in said basin at a predetermined level,
    a vertical watertight tubular structure supported on the bottom of said basin, the top of said structure being beneath said level,
    means for withdrawing water from the lower portion of said structure,
    liquid impervious baffle means surrounding the upper portion of said tubular structure, said baffle means being spaced from said tubular structure and extending above said predetermined level,
    settling means mounted above the bottom of said basin between said tubular structure and said baffle means comprising a plurality of tubes inclined at a large acute angle with respect to the horizontal,
    and means for conveying sewage from said basin to the bottom of said settling means,
    whereby removal of water from said tubular structure causes liquid to flow from said basin to and upwardly through said settling means and thence into said tubular structure.

2. An aerated basin as set forth in claim 1 with a filter bed incorporated within the vertical structure above said means for withdrawing water.

3. An aerated basin as set forth in claim 1 including aerating means in said basin for effecting the introduction of air into the sewage therein and for causing circulation of sewage in said basin.

4. An aerated basin as set forth in claim 1 wherein a body of filter media is disposed in said tubular structure.

5. An aerated basin as set forth in claim 1, said baffle means having a notch in the upper edge thereof having a lower edge slightly beneath said predetermined level, and water spray means mounted on said baffle means for spraying water on the surface of the liquid within said baffle means and inducing flow of any floating material within said baffle means through said notch and out of the space defined by said baffle.

6. An aerated basin as set forth in claim 1,
    said baffle means comprising an inner wall and an outer wall spaced horizontally outwardly of said inner wall and defining a channel therewith, said outer wall having a plurality of openings therein for permitting the passage of liquid from said basin into said channel.

7. An aerated basin as set forth in claim 6 including means adjacent the said outer wall for inducing an upward flow of liquid therealong.

8. An aerated basin as set forth in claim 6 including means adjacent the lower edge of said outer wall for releasing air therealong.

9. An aerated basin as set forth in claim 8 including a baffle extending downwardly from the lower edge of said outer wall.

10. An aerated basin as set forth in claim 8 including a plate inclined downwardly and outwardly from the inner edge of said settling means to guide and direct separated solids flowing downwardly from said settling means outwardly into said basin.

11. An aerated basin as set forth in claim 10 including a baffle extending downwardly and inwardly from the lower edge of said outer wall but terminating above said plate so as to define a passage for the downwardly flowing separated solids.

12. An aerated basin as set forth in claim 10 including tube modules installed between the inner and outer walls comprising a plurality of tubes inclined at a large acute angle with respect to the horizontal.

13. In an apparatus for separating settleable materials from a liquid:
 a basin for retaining a supply of settleable material carrying liquid,
 a settling means comprising a plurality of tubes inclined at a large acute angle to the horizontal, said settling means being mounted in said basin with the tops of said tubes positioned beneath the liquid level therein and with the bottoms of said tubes above the bottom of said basin,
 first wall means isolating the area over the tops of said tubes from the remainder of said basin,
 second wall means adjacent said settling means defining therewith a vertical channel, said second wall means having means therein providing communication between said basin and said channel and permitting flow of liquid from said basin into said channel,
 said second wall means extending a substantial distance beneath the lower ends of said settling means,
 and liquid flow inducing means adjacent the outer surface of said second wall means and above the lower edge thereof for inducing flow of liquid upwardly along said wall.

14. The apparatus of claim 13 wherein said liquid flow inducing means comprises means for releasing air along the outer surface of said second wall means.

References Cited

UNITED STATES PATENTS

| | | | |
|---|---|---|---|
| 2,573,615 | 10/1951 | Seailles | 210—521 |
| 3,346,122 | 10/1967 | Cornelissen | 210—522 |
| 3,433,359 | 3/1969 | Lundin et al. | 210—265 X |
| 3,446,357 | 5/1969 | Gomella | 210—265 X |

JAMES L. DeCESARE, Primary Examiner

U.S. Cl. X.R.

210—220, 256, 265, 521